United States Patent
Brune

(10) Patent No.: US 9,494,701 B2
(45) Date of Patent: Nov. 15, 2016

(54) METHOD TO IMPROVE SPATIAL SAMPLING OF VERTICAL MOTION OF SEISMIC WAVEFIELDS ON THE FREE SURFACE OF THE EARTH BY UTILIZING HORIZONTAL ROTATIONAL MOTION AND VERTICAL MOTION SENSORS

(75) Inventor: Robert H. Brune, Evergreen, CO (US)

(73) Assignee: Geokinetics, Inc., Houston, TX (US)

( * ) Notice: Subject to any disclaimer, the term of this patent is extended or adjusted under 35 U.S.C. 154(b) by 903 days.

(21) Appl. No.: 13/823,039

(22) PCT Filed: Sep. 14, 2011

(86) PCT No.: PCT/US2011/051653
§ 371 (c)(1),
(2), (4) Date: Apr. 9, 2013

(87) PCT Pub. No.: WO2012/037292
PCT Pub. Date: Mar. 22, 2012

(65) Prior Publication Data
US 2013/0211727 A1    Aug. 15, 2013

Related U.S. Application Data

(60) Provisional application No. 61/390,938, filed on Oct. 7, 2010, provisional application No. 61/382,789, filed on Sep. 14, 2010.

(51) Int. Cl.
*G01V 1/00* (2006.01)
*G01V 1/28* (2006.01)
*G01V 1/24* (2006.01)

(52) U.S. Cl.
CPC .. *G01V 1/24* (2013.01); *G01V 1/28* (2013.01)

(58) Field of Classification Search
CPC .......................................................... G01V 1/24
See application file for complete search history.

(56) References Cited

U.S. PATENT DOCUMENTS

2006/0245300 A1*  11/2006  De Kok ................... G01V 1/38
                                                                          367/15

* cited by examiner

*Primary Examiner* — Phuong Huynh
(74) *Attorney, Agent, or Firm* — Karen B. Tripp

(57) ABSTRACT

The present method provides spatial sampling of a seismic wavefield on the free surface of the earth at an effective spatial sampling denser than the physical layout of the sensors. The sensors are comprised of a sensing element for vertical particle motion at the earth's surface, and a sensing element for rotational motion around a horizontal axis at the surface of the earth. Stress and wavefield conditions known at the free surface of the earth allow the rotational sensing element to yield the transverse horizontal gradient of the vertical particle motion wavefield. This horizontal gradient and the vertical particle motion data are utilized in the technique of ordinate and slope sampling to yield an improved transverse spatial sampling of the vertical particle motion wavefield. The method has a wide range of application in seismic surveys in oil and gas exploration and production.

8 Claims, 3 Drawing Sheets

METHOD TO IMPROVE SPATIAL SAMPLING OF VERTICAL MOTION OF SEISMIC WAVEFIELDS ON THE FREE SURFACE OF THE EARTH BY UTILIZING HORIZONTAL ROTATIONAL MOTION AND VERTICAL MOTION SENSORS

RELATED APPLICATIONS

This application claims priority from U.S. Provisional Patent Application Ser. No. 61/390,938, filed Oct. 7, 2010, pending, and U.S. Provisional Patent Application Ser. No. 61/382,789, filed Sep. 14, 2010, pending.

BACKGROUND OF THE INVENTION

1. Field of the Invention

The present invention pertains to the art of seismic surveying for the exploration and production of petroleum reservoirs, and more specifically to the joint use of linear and rotational sensors on the free surface of the earth to enhance the spatial sampling of seismic wavefields.

2. Description of Relevant Art

There is a long term trend in seismic reflection surveying for oil and gas exploration and production to utilize sensing elements, commonly known as geophones, at decreasing spatial sample intervals. There is a continuing need for economical ability to measure seismic wavefields at finer spatial sampling.

It is well understood in many fields of physical science and engineering that a complete representation of mechanical motion requires the measurement of six degrees-of-freedom. Typically this is accomplished by measuring three orthogonal linear motions, and measuring rotations around three orthogonal axes.

There is a well established technology for measurement of the linear particle motion of seismic wavefields in the earth. Many commercial sensors exist to measure particle velocity or particle acceleration along one, or up to three, linear axes, utilizing various physical concepts to accomplish the measurements. It is most common to utilize measurements of the vertical particle motion.

There is an evolving commercial technology for measurement of the rotational particle motion of seismic wavefields in the earth. This includes sensors such as those commercially offered by, for example, MetTech (model Metr-3, http://www.mettechnology.com (2010)) in Jersey City, N.J. and Eentec (models R-1 and R-2, http://www.eentec.com/R-1_data_new.htm (2010)) in Kirkwood, Mo.

The utility of rotational seismic measurements is appreciated in earthquake and regional crustal seismology, as discussed, for example, in W. Lee, et. al. (eds.), "Rotational Seismology and Engineering Applications," vol. 99 (no. 28 supp.) Bull. Seismological Society of America (May 2009). Seismic rotational motion is commonly understood to be the vector curl of the infinitesimal displacement field. The existing rotational sensors are understood to measure the components of this vector curl.

The significant effect of the free surface of the earth on stress fields, strain fields, and seismic wave fields is widely understood. This is described, for example, in K. Aki & P. Richards, *Quantitive Seismology*, University Science Books, pp 128ff, 184-185 (2002). The stress components, commonly referred to as $\sigma_{xz}$ and $\sigma_{yz}$, involving the nominal vertical direction, normal to the free surface, have zero value at the free surface.

In the field of sampled data analysis, there is a well established technology for enhanced sampling rate by utilizing the sampling of the ordinate values and the slope of the function being sampled. This technology is commonly understood for time series data, and is also directly applicable to spatial sampling. This technology, often referred to as Ordinate and Slope sampling, is described, for example, in R. Bracewell, *The Fourier Transform and its Applications*, McGraw-Hill, pp. 230-232 (2000).

SUMMARY OF THE INVENTION

The object of the present invention is to improve horizontal spatial sampling of a seismic wavefield on the free surface of the earth without the need to occupy more locations for sensing elements. This object is accomplished by using a novel combination of the more complete description of particle motion offered by rotational motion sensors used with linear motion sensors.

The invention includes, in its many aspects and embodiments, a method to enhance the spatial sampling of seismic data recorded on the free surface of the earth by utilizing vertical particle motion and rotational motion around horizontal axes. More particularly, the method comprises: recording the vertical particle motion; recording the rotational motion around a horizontal axis orthogonal to the spatial horizontal direction for which enhanced spatial sampling is desired; utilizing this rotational motion as representative of the horizontal spatial gradient of the vertical motion; and utilizing this horizontal spatial gradient of the vertical particle motion, along with the vertical particle motion in an Ordinate and Slope signal reconstruction algorithm.

DETAILED DESCRIPTION OF THE INVENTION

Figure 1:
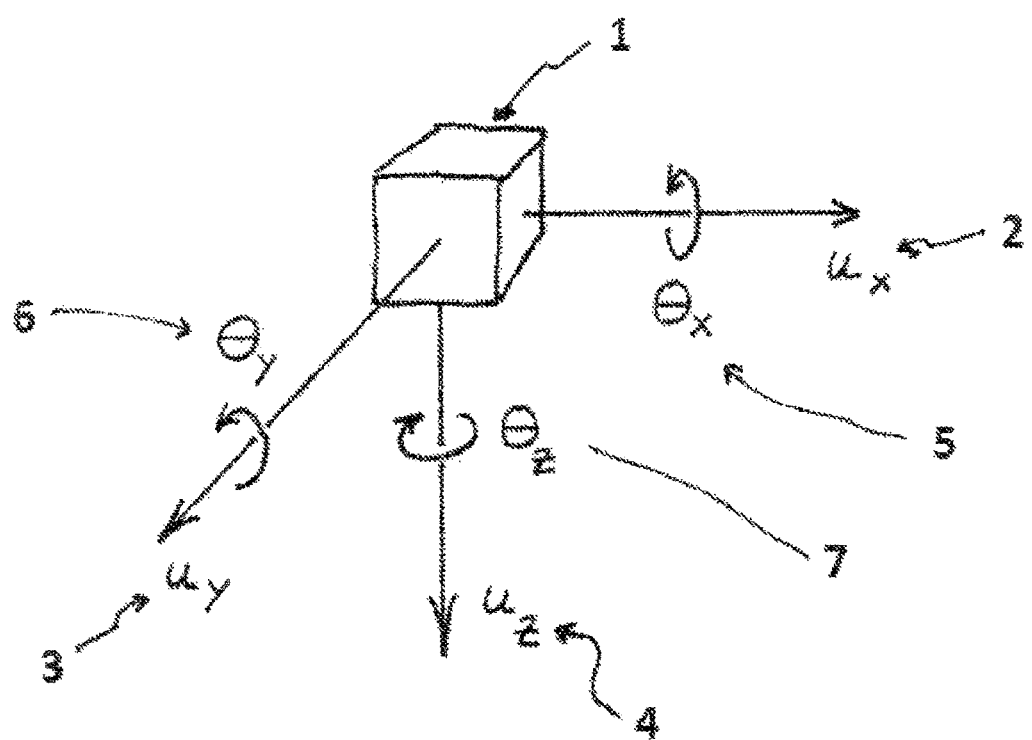
FIG. 1 is a diagrammatic view of the linear motion and rotational motion of a representative elemental volume of the earth.

The particle motion of a representative elemental volume 1 of the earth is as depicted in FIG. 1. A Cartesian coordinate system is utilized, but those skilled in the art will recognize that various alternate equivalent coordinate systems and representations of particle motion may be utilized, including the ability to handle the case of a sloping free surface. The motion is comprised of three linear motions, 2-4, and three rotational motions, 5-7. A right-hand rule for axes and rotation sign conventions is used throughout for the present invention.

Rotational seismic data measured by rotational seismic motion sensors is typically defined as ½ of the vector curl of the displacement wavefield, u. Alternatively, in current commercially available rotational sensors, measurements may be made of the time derivative of this rotational displacement which is known as the angular rate, or angular velocity; or of the second time derivative of this rotational displacement which is known as the angular acceleration. It will be understood by those skilled in the art that the use of various time derivatives does not affect the present invention so long as the same time derivative is consistently utilized for both the linear and rotational motion measurements.

In the description of the present invention, without loss of generality, we shall consider that spatial sampling is to be enhanced in the x horizontal coordinate direction. From the mathematical definition of vector curl, we know that in Cartesian coordinates the y component of the rotational seismic motion is given as:

$$\theta_y \equiv \frac{1}{2}\left(\frac{\partial u_x}{\partial z} - \frac{\partial u_z}{\partial x}\right) \qquad (1)$$

where $\theta_y$ is the rotational motion around the y axis, and $u_x$, $u_z$ are the x and z Cartesian components of the infinitesimal vector displacement field. The operators $$\frac{\partial}{\partial z} \text{ and } \frac{\partial}{\partial x}$$

are the partial derivatives in the spatial directions z and x, which will be recognized as spatial gradients.

This equation defines that rotational seismic data is comprised of particular combinations of certain spatial gradients of components of the infinitesimal vector displacement field.

Figure 2:
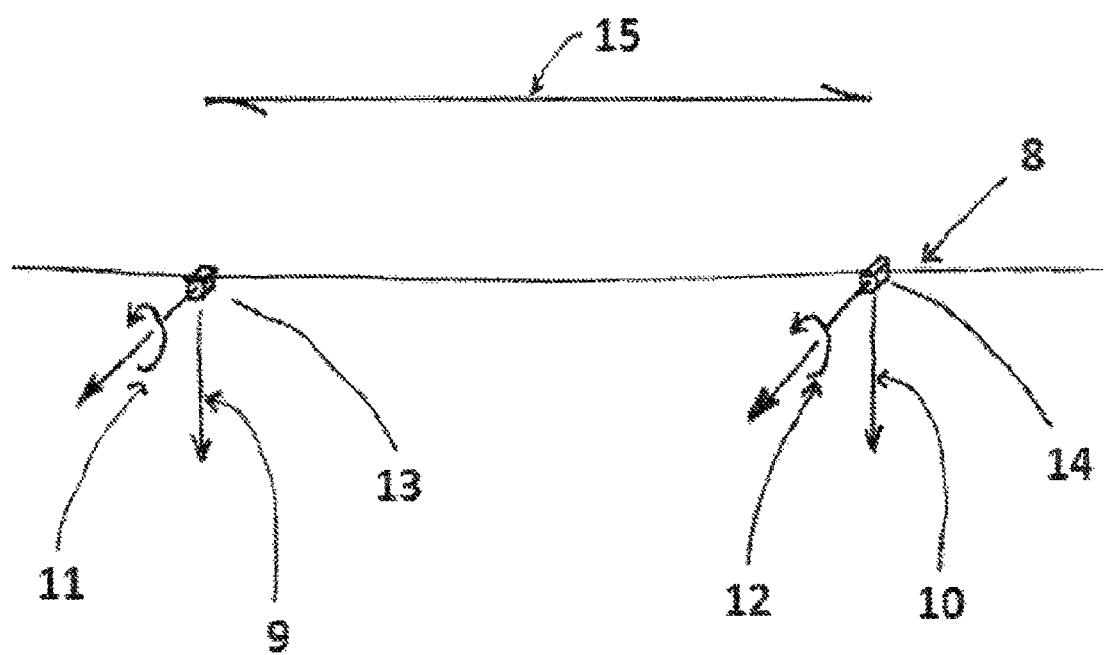
FIG. 2 is a diagrammatic view of the configuration of linear motion and rotational motion sensors on the free surface of the earth such as to enable the Ordinate and Slope sampling method of the present invention.

FIG. 2 is a vertical cross section along a horizontal x axis, at the free surface of the earth. It diagrammatically depicts measurements on the free surface of the earth 8. The linear vertical motion $u_z$ 9-10 and horizontal rotational motion $\theta_y$ 11-12 around the y horizontal axis, said y axis pointing out of the plane of the cross section, are measured at two locations 13-14 which are separated along the horizontal x-axis by a distance $\Delta x$ 15 which is in the spatial horizontal direction for which enhanced spatial sampling is desired.

The measurements, particularly of the rotational motion, are made at the free surface of the earth. Those skilled in the art will recognize that there is zero traction across the free surface. Thus for a homogeneous, isotropic earth it is recognized that three components of the stress tensor in Cartesian coordinates have zero values at the free surface.

$$\sigma_{xz} = \sigma_{yz} = \sigma_{zz} = 0 \qquad (2)$$

It is recognized that there is continuity of the stress across the free surface of the earth. In a linear elastic homogeneous isotropic earth it is recognized that components of the stress and strain tensors are related by linear equations. In particular it is recognized that at the free surface of the earth $$\sigma_{xz}^{air} = \sigma_{xz}^{earth} = 2(\mu^{earth})e_{xz} \qquad (3)$$

where $\mu^{earth}$ is the non-zero shear modulus of the earth at the free surface, and $e_{xz}$ is a component of the infinitesimal strain tensor in Cartesian coordinates, which is defined as $$e_{xz} \equiv 1/2\left(\frac{\partial u_x}{\partial z} + \frac{\partial u_z}{\partial x}\right) \qquad (4)$$

On the free surface, using $$\sigma_{xz} = 0$$

from equation (2) substituted into equation (3), it is recognized that the strain component defined in equation (4) has a zero value on the free surface $$e_{xz} \equiv 1/2\left(\frac{\partial u_x}{\partial z} + \frac{\partial u_z}{\partial x}\right) = 0$$

This equation is recognized as equivalent to:

$$\frac{\partial u_x}{\partial z} = -\frac{\partial u_z}{\partial x} \qquad (5)$$

This is a relationship between spatial gradients of components of the infinitesimal vector displacement field which is applicable at the free surface of the earth.

By utilizing the relationship of equation (5) in the definition of the y component of rotational motion as given in equation (1), it is seen that:

$$\theta_y = \left(-\frac{\partial u_z}{\partial x}\right)$$

Thus the negative of the measured value of the y component of rotational motion, $\sigma_y$, is equivalent to the horizontal spatial gradient, or slope, in the x direction for the vertical particle motion, $u_z$.

Figure 3:
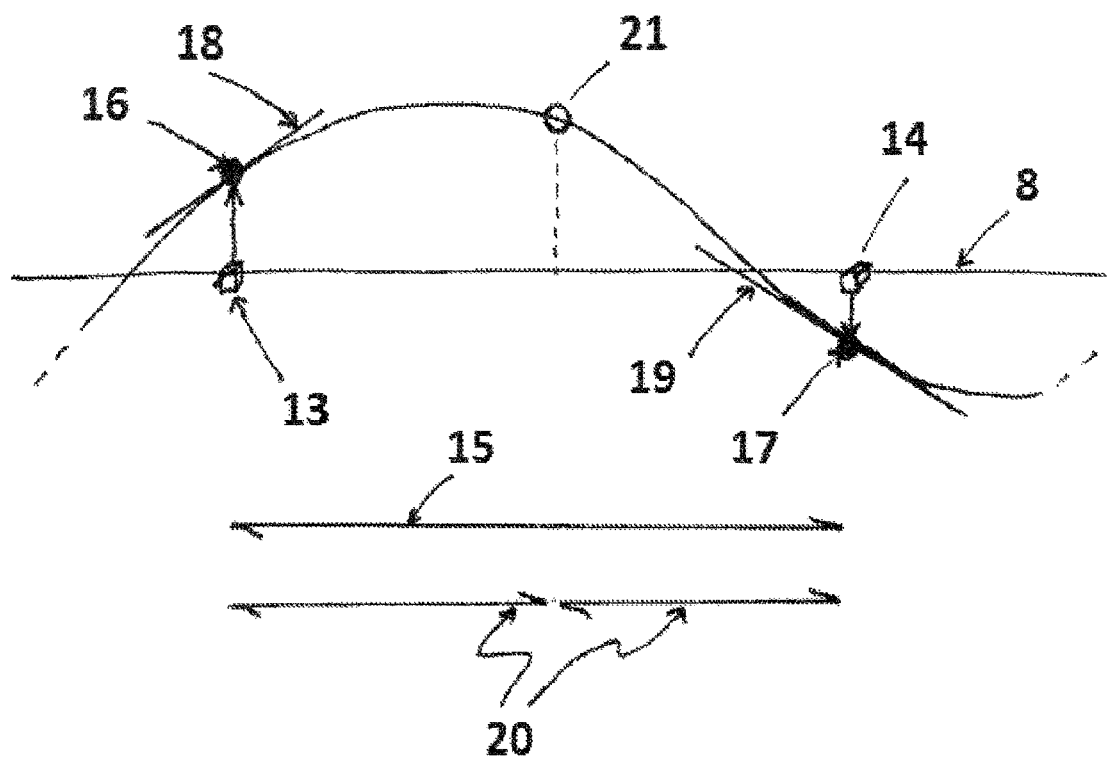
FIG. 3 is a diagrammatic representation of the Ordinate and Slope signal reconstruction aspect of the present invention.

FIG. 3 diagrammatically shows the reconstruction of the seismic wavefield utilizing the Ordinate and Slope technique. This figure shows two locations 13-14, along the horizontal x axis, at which we have Ordinate and Slope samples, which are respectively the vertical particle motions, $u_z$ 16-17 and the slopes $$\frac{\partial u_z}{\partial x}$$

18-19.

As will be recognized by those skilled in the art, the reconstruction of a wavefield in the x direction by Ordinate and Slope Sampling is done by means of $\text{sinc}^2(x)$ reconstruction functions for the Ordinate, and $x*\text{sinc}^2(x)$ reconstruction functions for the Slope, with the appropriate scaling for the particular spatial sample interval used. This technique is described, for example, in R. Bracewell, *The Fourier Transform and its Applications*, McGraw-Hill, (2000), pp. 230-232.

By utilizing the technique of the present invention, for data recorded with a spatial sampling of $\Delta x$, the effective spatial sampling is $(\Delta x/2)$ 20 in FIG. 3, which is seen to be at twice the spatial sampling rate of the physical recording locations on the free surface of the earth. The method of the present invention is seen to be equivalent to having an additional sample of the vertical particle motion, $u_z$, at the intermediate location 21 at a spatial sampling interval of $(\Delta x/2)$ 20. This effectively doubles the spatial Nyquist frequency for sampling in the x horizontal direction.

Those skilled in the art will recognize from the teachings herein that the method of the present invention can be applied in both horizontal directions to improve the spatial sampling of the vertical particle motion in two horizontal dimensions.

In a particular embodiment, consider a 3D seismic survey utilizing crossed array type geometry with source and receiver lines orthogonal to each other, and with, say for example, 880 fee crossline spacing between receiver lines.

Then for each field data record the present invention will yield an effective spatial sampling of 440 ft. in the crossline direction for the vertical particle motion component.

In another embodiment, consider a 2D or 3D survey with inline spacing between receiver locations on the surface of the earth, of, say for example, 220 feet. Then for each field data record the present invention will yield an effective spatial sampling of 110 ft. in the inline horizontal direction for the vertical particle motion component.

The foregoing description of the invention is intended to be a description of preferred embodiments. Various changes in the details of the described method can be made without departing from the intended scope of this invention as defined by the appended claims.

What is claimed is:

1. A method for seismic surveying for a petroleum reservoir employing joint use of linear and rotational sensors on the free surface of the earth, comprising:
   a. positioning sensors for measuring a vertical motion component of seismic data on the free surface of the earth;
   b. communicating with the sensors to obtain the vertical motion component of seismic data on the free surface of the earth in a first horizontal direction;
   c. communicating with the sensors to obtain a measured rotational motion on the free surface of the earth around a second horizontal axis orthogonal to the first horizontal direction;
   d. computing the gradient of vertical motion in the first horizontal direction by utilizing the measured rotational motion around said second horizontal axis and the relationships of spatial derivatives of displacement components at the free surface of the earth;
   e. reconstructing the horizontal sampling of the seismic wave fields in the first horizontal direction, by means of the Ordinate and Slope sampling technique, whereby the effective sampling of seismic data recording is at a spatial sample spacing of half the physical spacing of the sensors in the first horizontal direction; such that the horizontal spatial seismic wave field at the free surface of the earth is enhanced or improved without positioning additional sensors on the free surface of the earth; and
   f. collecting or obtaining at least one field data record wherein the effective spatial sampling spacing is half the physical spacing of the sensors in the first horizontal direction.

2. The method of claim 1 wherein the sensors are receiver lines with a crossline spacing in a crossed array type geometry for a three dimensional seismic survey of about 880 feet between receiver lines and the field data record yields an effective spatial sampling of about 440 feet in the crossline direction for the vertical particle motion.

3. The method of claim 1 for a two dimensional seismic survey having inline spacing between sensor locations on the surface of the free earth of about 220 feet, wherein the field data record yields an effective spatial sampling of about 110 feet in the inline horizontal direction for the vertical component of particle motion.

4. The method of claim 1 for a three dimensional seismic survey having inline spacing between sensor locations on the surface of the free earth of about 220 feet, wherein the field data record yields an effective spatial sampling of about 110 feet in the inline horizontal direction for the vertical component of particle motion.

5. A method for recording seismic data with enhanced spatial sampling of vertical motion of seismic wave fields on the free surface of the earth, the method comprising:
   a. positioning sensors for recording and recording the vertical particle motion;
   b. recording the rotational motion around a horizontal axis orthogonal to the spatial horizontal direction for the enhanced spatial sampling;
   c. using the rotational motion as representative of the horizontal spatial gradient of the vertical motion;
   d. using the horizontal spatial gradient of the vertical particle motion with the vertical particle motion in the Ordinate and Slope sampling technique, reconstructing the horizontal sampling of the seismic wave field in the first horizontal direction, whereby the effective sampling of seismic data recording is at a spatial sample spacing of half the physical spacing of the sensors in the first horizontal direction, such that the horizontal spatial sampling of the seismic wave field at the free surface of the earth is enhanced or improved without positioning additional sensors on the free surface of the earth; and
   e. collecting or obtaining at least one field data record wherein the effective spatial sampling spacing is half the physical spacing of the sensors in the first horizontal direction.

6. The method of claim 5 wherein the sensors are receiver lines with a crossline spacing in a crossed array type geometry for a three dimensional seismic survey of about 880 feet between receiver lines and the field data record yields an effective spatial sampling of about 440 feet in the crossline direction for the vertical particle motion.

7. The method of claim 5 for a two dimensional seismic survey having inline spacing between sensor locations on the surface of the free earth of about 220 feet, wherein the field data record yields an effective spatial sampling of about 110 feet in the inline horizontal direction for the vertical component of particle motion.

8. The method of claim 5 for a three dimensional seismic survey having inline spacing between sensor locations on the surface of the free earth of about 220 feet, wherein the field data record yields an effective spatial sampling of about 110 feet in the inline horizontal direction for the vertical component of particle motion.

\* \* \* \* \*